(12) United States Patent
Fujiwara

(10) Patent No.: US 11,919,599 B2
(45) Date of Patent: Mar. 5, 2024

(54) SADDLE RAISING DEVICE

(71) Applicant: FUJIWARA WHEEL INCORPORATED, Osaka (JP)

(72) Inventor: Hisao Fujiwara, Osaka (JP)

(73) Assignee: FUJIWARA WHEEL INCORPORATED, Osaka (JP)

( * ) Notice: Subject to any disclaimer, the term of this patent is extended or adjusted under 35 U.S.C. 154(b) by 184 days.

(21) Appl. No.: 17/616,818

(22) PCT Filed: Dec. 21, 2020

(86) PCT No.: PCT/JP2020/047636
§ 371 (c)(1),
(2) Date: Dec. 6, 2021

(87) PCT Pub. No.: WO2021/132135
PCT Pub. Date: Jul. 1, 2021

(65) Prior Publication Data
US 2022/0306234 A1    Sep. 29, 2022

(30) Foreign Application Priority Data
Dec. 24, 2019 (JP) .................................. 2019-233138

(51) Int. Cl.
*B62J 1/06* (2006.01)
*B62K 19/36* (2006.01)
*B62J 1/08* (2006.01)

(52) U.S. Cl.
CPC ............. *B62K 19/36* (2013.01); *B62J 1/06* (2013.01); *B62J 2001/085* (2013.01)

(58) Field of Classification Search
CPC ............................. B62J 1/06; B62J 2001/085
See application file for complete search history.

(56) References Cited

U.S. PATENT DOCUMENTS 8,308,124 B2 * 11/2012 Hsu ............................ B62J 1/08
                                                              297/215.13 X
9,688,331 B1 * 6/2017 Shirai ........................ B62J 1/08
(Continued)

FOREIGN PATENT DOCUMENTS

| CN | 202464051 | 10/2012 |
|---|---|---|
| JP | 3-109180 | 5/1991 |

(Continued)

OTHER PUBLICATIONS

International Search Report dated Mar. 9, 2021 in International (PCT) Application No. PCT/JP2020/047636.
(Continued)

*Primary Examiner* — Rodney B White
(74) *Attorney, Agent, or Firm* — Wenderoth, Lind & Ponack, L.L.P.

(57) ABSTRACT

A bicycle saddle raising device includes a fixed tube carrying a slidable rising rod, stroke springs biasing the rising rod upward, a locking mechanism for locking the rising rod at a predetermined height, and a locking/unlocking switching arrangement. The locking mechanism includes an engaging member having a plurality of engaging recesses, and claw members having claws which engage the engaging member. The locking/unlocking switching arrangement disengages the claws from the engaging recesses. A claw state switching member presses the claws in a direction in which they engage the engaging recesses.

8 Claims, 15 Drawing Sheets

(56) References Cited

U.S. PATENT DOCUMENTS

| | | | | |
|---|---|---|---|---|
| 10,053,173 | B1* | 8/2018 | Metz | B62K 19/36 |
| 10,668,968 | B2* | 6/2020 | Shipman | B62J 1/08 |
| 2006/0175792 | A1* | 8/2006 | Sicz | B62J 1/08 |
| | | | | 297/215.13 X |
| 2011/0187166 | A1* | 8/2011 | Walsh | B62J 1/08 |
| | | | | 297/215.13 |
| 2012/0104810 | A1 | 5/2012 | Alsh | |
| 2012/0228906 | A1* | 9/2012 | McAndrews | B62J 1/08 |
| | | | | 297/215.13 X |
| 2013/0300163 | A1 | 11/2013 | Shirai | |
| 2015/0191208 | A1* | 7/2015 | Hsu | B62J 1/08 |
| | | | | 403/322.3 |
| 2015/0225030 | A1* | 8/2015 | Shirai | B62J 1/08 |
| | | | | 403/27 |
| 2016/0121952 | A1* | 5/2016 | Shirai | B62J 1/08 |
| | | | | 248/161 |
| 2016/0236739 | A1* | 8/2016 | Shirai | B62J 1/08 |
| 2016/0304146 | A1* | 10/2016 | Teixeira | B62J 1/06 |
| 2016/0355225 | A1* | 12/2016 | Shirai | B62J 1/08 |
| 2017/0106927 | A1* | 4/2017 | McAndrews | B62J 1/06 |
| 2017/0274949 | A1* | 9/2017 | Pittens | B62J 1/08 |
| 2018/0079462 | A1* | 3/2018 | Shirai | B62K 25/08 |
| 2018/0186419 | A1* | 7/2018 | Shipman | B62K 19/36 |
| 2018/0194418 | A1* | 7/2018 | Bowers | B62J 1/08 |
| 2018/0244330 | A1* | 8/2018 | Shirai | B62J 1/08 |
| 2019/0002051 | A1* | 1/2019 | Shipman | B62J 1/06 |
| 2019/0061852 | A1* | 2/2019 | Shirai | B62K 19/36 |
| 2019/0071146 | A1* | 3/2019 | Shirai | B62K 19/36 |
| 2019/0111985 | A1* | 4/2019 | Teixeira | B62K 25/286 |
| 2019/0300085 | A1* | 10/2019 | Shirai | B62J 1/08 |
| 2019/0351966 | A1* | 11/2019 | Shirai | B62J 1/08 |
| 2020/0023918 | A1* | 1/2020 | Shirai | F15B 15/16 |

FOREIGN PATENT DOCUMENTS

| | | |
|---|---|---|
| JP | 2003-165474 | 6/2003 |
| JP | 2005-225303 | 8/2005 |
| JP | 2006-27497 | 2/2006 |
| JP | 2009-83839 | 4/2009 |

OTHER PUBLICATIONS

Extended European Search Report dated Jun. 23, 2022 in corresponding European Patent Application No. 20906811.3.
English language translation of International Preliminary Report on Patentability dated Mar. 9, 2021 in corresponding Intenrational (PCT) Patent Application No. PCT/JP2020/047636.

* cited by examiner

SADDLE RAISING DEVICE

TECHNICAL FIELD

The present invention relates to a saddle raising device for raising and lowering the saddle of a bicycle while a person is riding the bicycle.

BACKGROUND ART

The saddle of a bicycle is typically mounted on the upper end of a seat post slidably inserted in a vertical seat tube of the bicycle. The seat post can be fixed in position at a desired height by clamping, with a claim, the seat post to the seat tube at a desired position of the sliding direction of the seat post.

The saddle is preferably set at a relatively higher position during travel of the bicycle so that the power can be effectively transmitted to the pedals, and set at a relatively lower position when stopping the bicycle for a safety reason, i.e., so that the rider can easily set the feet on the ground. However, the above-described ordinary saddle raising devices are not designed to enable a change in the saddle height during travel.

JP2006-27497A and JP2009-83839 both propose devices that enable raising and lowering of the saddle of a bicycle during travel of the bicycle. In particular, these devices include a spring biasing the saddle upward, and a means for mitigating a sudden rise or fall of the saddle, such as a shock absorber or a fluid spring, and are configured to switch, when a lever at the handle of the bicycle is operated by the rider, between a position allowing ascent and descent of the saddle and a position preventing the ascent and descent of the saddle.

The saddle is fixed to the upper end of a rising rod (piston) inserted in the seat post so as to be vertically movable in the inner space (cylinder) of the seat post. A lower receiving member is mounted to an upper portion of the seat post, and a lower receiving member is mounted to an upper portion of the rising rod, with the upper and lower receiving members coupled together by a link mechanism. The link mechanism includes lower link pieces coupled to the lower receiving member, and upper link pieces coupled to the upper receiving member. As the rising rod slides, the upper and lower link pieces open or close within a predetermined range, allowing ascent or descent of the saddle. Because the lower link pieces and the upper link pieces are biased in the opening direction by a spring, the rising rod is biased in the protruding direction. In JP2009-83839, as a means for biasing the rising rod upward, the elastic force of a fluid spring disposed in the seat post is additionally utilized.

The link mechanism further includes a saddle ascent/descent switching means for switching between an ascent/descent allowing state in which the saddle is allowed to ascend and descend and a locking state in which the ascent and descent of the saddle is restricted. The ascent/descent switching means is further configured to allow switching, for the ascent/descent switching state, between an ascent-only state in which the saddle is allowed only to ascend, and a descent-only state in which the saddle is allowed only to descend.

In either of the above-described conventional saddle raising devices, as the saddle ascent/descent switching means, a ratchet mechanism including a gear and teeth that meshes with the gear is used. The ratchet mechanism is disposed between the upper link pieces and the lower link pieces.

Because such an ascent/descent switching means needs to be designed to withstand the weight of a rider, if the ascent/descent switching means is mounted in the link mechanism, this could result in a large link mechanism. In order to reliably and accurately lock the saddle at a predetermined height, a strong and stable ascent/descent switching means is required.

SUMMARY OF THE INVENTION

An object of the present invention is, for saddle raising devices of the type that allows ascent and descent of the saddle of a bicycle while a person is riding on the bicycle, to provide a saddle raising device which allows, reliably and accurately, locking the saddle at a predetermined height, and which is strong and stable enough to withstand the rider's weight.

In order to achieve the above-described object, the present invention provides a saddle raising device comprising: a fixed tube configured to be inserted into a frame of a bicycle; a rising rod having an upper end portion to which the saddle of the bicycle is configured to be mounted, the rising rod being slidably inserted in the fixed tube; a stroke spring biasing the rising rod upwardly in an axial direction of the fixed tube, relative to the fixed tube; a locking mechanism configured to lock the rising rod relative to the fixed tube at a predetermined height; and a locking/unlocking switch configured to switch the locking mechanism between an ascent/descent allowing state in which the locking mechanism allows ascent and descent of the rising rod, and a locking state in which the locking mechanism restricts the ascent and descent of the rising rod. The locking mechanism comprises: an engaging member disposed in the fixed tube and having a plurality of engaging recesses arranged in the axial direction of the fixed tube; and a claw member carried by the rising rod and having a claw configured to be capable of meshing with any one of the engaging recesses. The locking/unlocking switch comprises: a wire configured to receive a pulling force inputted from an operating portion of the bicycle when a rider of the bicycle operates the operating portion; and a claw state switching member configured to be pulled by the wire while the pulling force is being applied to the wire, and thereby disengage the claw from the engaging recess, and with the pulling force removed from the wire, configured to press the claw into meshing engagement with a selected one of the engaging recesses.

In one arrangement of the invention, the engaging member is a center axis rod rising in the fixed tube; the plurality of engaging recesses are composed of a plurality of groups of engaging recesses, each group of engaging recesses being arranged in a circumferential direction around an axis of the center axis rod; and the claw member is composed of a plurality of claw members arranged such that the claws of the plurality of claw members are capable of meshing simultaneous with the engaging recesses of any group, respectively.

In one arrangement of the invention, the claw state switching member is carried by a wire engaging tube connected to the wire, and the wire engaging tube has a lower end thereof supported by the rising rod via a compression spring, and has an upper end thereof supported by the rising rod via a return spring.

In a modified example, each of the engaging recesses includes: a recess upper surface configured to engage an upper end of the claw or a corresponding one of the claws; a recess lower surface configured to engage a lower end of the claw or the corresponding one of the claws; and a recess bottom surface connecting together the recess upper surface and the recess lower surface. The recess upper surface either extends perpendicular to the axial direction, or slopes downward in a direction away from the recess bottom surface, and the recess lower surface slopes downward in the direction away from the recess bottom surface.

The present invention provides, for saddle raising devices of the type that allows ascent and descent of the saddle of a bicycle while a person is riding on the bicycle, a saddle raising device which allows, reliably and accurately, locking the saddle at a predetermined height, and which is strong and stable enough to withstand the rider's weight.

DETAILED DESCRIPTION OF THE INVENTION

An embodiment of the present invention is described with reference to the drawings. The embodiment is a general-purpose saddle raising device to be fitted on commercially available bicycles including ordinary bicycles known as "city bikes".

Figure 13:
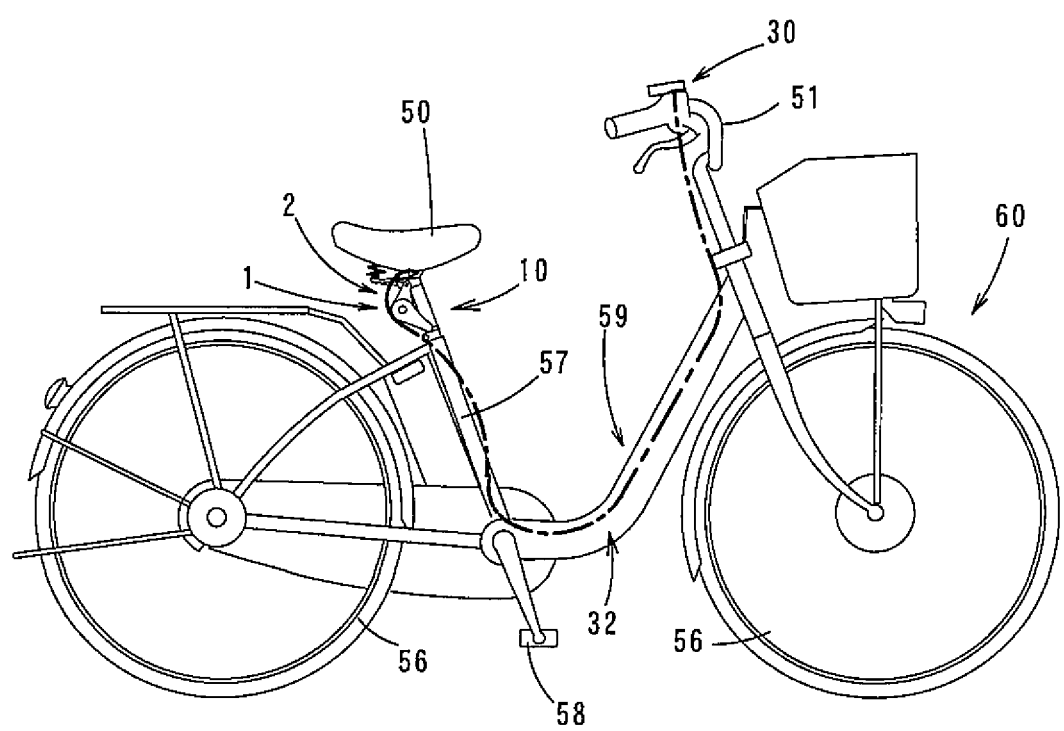
FIG. 13 shows an entire bicycle using the saddle raising device.

FIGS. 1 to 4 show a main portion of the saddle raising device 10, while FIGS. 1 to 12 illustrate the operation of the saddle raising device 10, and its component parts. FIG. 13 shows a bicycle 60 on which the saddle raising device 10 is mounted. The bicycle 60 includes a frame 59 connecting the front and rear wheels 56. The frame 59 includes a tubular seat tube 57 extending upwardly at a substantially central portion of the bicycle 60. The saddle raising device 10 is mounted to the seat tube 57. The members of the saddle raising device 10 are, unless otherwise specified below, made of metals or metal-based materials. However, other well-known materials such as resin, fiber-reinforced resin, or carbon material, may be used if they provide sufficient strength and durability.

The saddle raising device 10 includes a fixed tube 1 inserted into the seat tube 57 through an upper end opening of the seat tube 57; and a rising rod 2 having a saddle 50 mounted to the upper end thereof, and slidably inserted in the fixed tube 1. The fixed tube 1 is, as with a seat post ordinarily used in a bicycle, fixed in position by being tightened against the seat tube 57 with a clamp. The saddle 50 is mounted to the upper end of the rising rod 2 by a retaining member 54 mounted to the saddle frame 53. For the comfort of a rider, saddle springs 55 are disposed between the saddle frame 53 and the saddle 50.

The rising rod 2 is biased upwardly in the axial direction of the fixed tube 1, relative to the fixed tube 1, by stroke springs 5b and 5c. The stroke springs 5b and 5c are provided in a pair of right and left link mechanisms 5 disposed between the fixed tube 1 and the rising rod 2.

The structure of the link mechanisms 5 is now described. A lower receiving member (outer flange-shaped receiving member) 3 is mounted to an upper portion of the fixed tube 1, and an upper receiving member (saddle receiving member) 4 is mounted to an upper portion of the rising rod 2. The lower receiving member 3 and the upper receiving member 4 are coupled together by the (right and left pair of) link mechanisms 5. The lower receiving member 3 is fixed to the fixed tube 1 by crimping. The upper receiving member 4 is fixed to the rising rod 2, also by crimping. The link mechanisms 5 are configured such that, as the rising rod 2 slides, lower link pieces 6 and an upper link piece 7 open and close within a predetermined range. Because the lower link pieces 6 and the upper link piece 7 are biased by the stroke springs 5b and 5c in the opening direction, this biasing force causes the rising rod 2 to rise, thus causing the saddle 50 to rise together with the rising rod 2. When the weight of the rider acts downwardly against the biasing force, the saddle descends together with the rising rod 2.

Figure 5A:
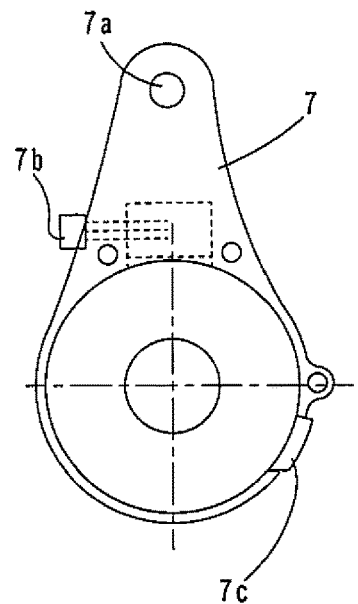
FIG. 5A is a side view showing an upper link piece of link mechanisms.
Figure 5B:
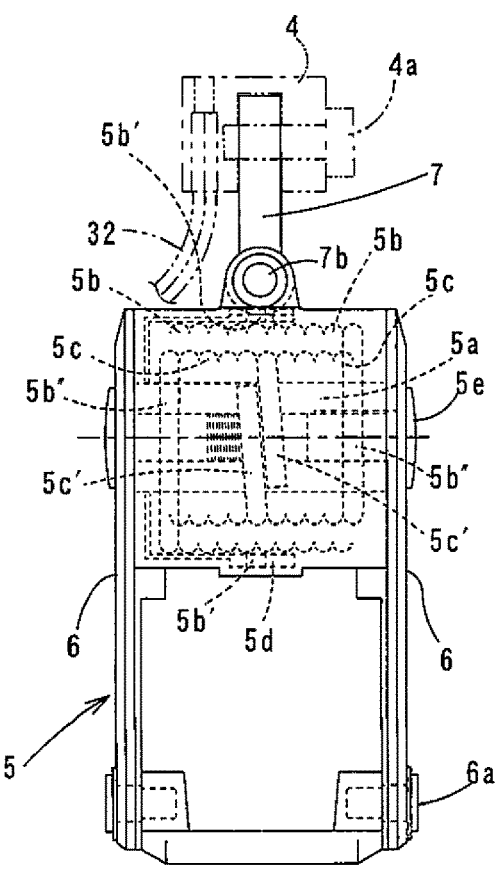
FIG. 5B is a front view of the link mechanisms.
Figure 5C:
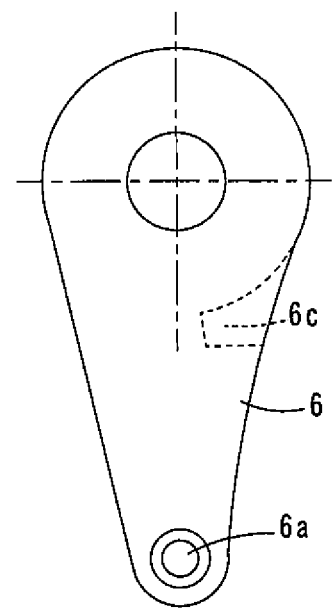
FIG. 5C is a side view showing a lower link piece of the link mechanisms.

The lower link pieces 6 are, as shown in FIGS. 5A to 5C, composed of two right and left members, and distal end portions thereof are coupled by pins 6a to the lower receiving member 3, which is fixed to the upper portion of the fixed tube 1, such that the lower receiving member 3 and the lower link pieces 6 are pivotable about the axes of the pins 6a. Proximal portions of the lower link pieces 6 are fitted on the outer periphery of a tubular axis member 5a at both axial ends of the axis member 5a, and both axial ends are fixed in position by screws 5e. The lower link pieces 6 and the axis member 5a are rotationally fixed relative to each other by a recess and a protrusion on the respective fitting portions thereof.

The upper link piece 7 is composed of a single member disposed between the right and left lower link pieces 6. Its distal end portion is coupled by a pin 7a to the upper receiving member 4, which is fixed to the upper portion of the rising rod 2, such that the upper receiving portion 4 and the upper link piece 7 are pivotable about the axis of the pin 7a. The proximal portion of the upper link piece 7 is composed of a tubular member called an "inner flange boss", and the inner flange boss at the proximal portion is fitted on the outer periphery of the axis member 5a. The upper link piece 7 is axially positioned by being sandwiched between the lower link pieces 6, which are located on both axial sides of the upper link piece 7, and the upper link piece 7 and the axis member 5a are pivotable about an axis. A helical gear is formed on the outer periphery of the inner flange boss of the upper link piece 7. A worm gear 7b is disposed adjacent to the outer periphery of the inner flange boss to mesh with the helical gear.

As shown in FIG. 5B, the stroke springs 5b, 5c are disposed on the outer periphery of the axis member 5a, and composed of two pairs of stroke springs, each pair being disposed on a respective side of the axis member 5a, and each pair being composed of a radially outer stroke spring 5b and a radially inner stroke spring 5c located radially inwardly of the radially outer stroke spring 5b. Each pair of the radially inner and outer stroke springs 5b and 5c form an inner and outer double-structure coil spring formed of a single continuous wire, with the inner and outer stroke springs 5b and 5c coupled together at the axially outer position by a coupling member 5b" extending in a diametrical direction of the coil spring.

Each of the right and left radially outer stroke springs 5b engages, at its axially inner end 5b', a spring engaging hole in the proximal portion of the upper link piece 7. Each of the right and left radially inner stroke springs 5c engages, at its axially inner end 5c', a spring receiving portion on the axis member 5a. That is, the end 5b' of each outwardly wound stroke spring 5b is fitted in the spring engaging hole of the inner flange boss having the helical gear, whereas the end 5c' of each inwardly wound stroke spring 5c is fitted in the spring receiving portion of the axis member 5a.

The radially outer and inner stroke springs 5b and 5c on the left of FIG. 5B are wound in the counterclockwise and clockwise directions, respectively, when seen in the axially outward direction from the axially inner ends 5b' and 5c'. The radially outer and inner stroke springs 5b and 5c on the right of FIG. 5B are wound in the clockwise and counterclockwise directions, respectively, when seen in the axially outward direction from the axially inner ends 5b' and 5c'. This means that the radially inner and outer stroke springs 5b and 5c that form each coil spring are wound in opposite directions to each other, whereas, in the front view of FIG. 5B, the right and left stroke springs 5b, as well as the right and left stroke springs 5c, are wound bilaterally symmetrical to each other with respect to the axial center of the axis member 5a.

Thus, by rotating the worm gear 7b in one direction, thereby rotating the inner flange boss about its axis in one direction via the helical gear meshing with the worm gear 7b, the biasing force by the right and left stroke springs 5b and 5c increases. By rotating the worm gear 7b in the other direction, thereby rotating the inner flange boss about the axis in the other direction via the helical gear meshing with the worm gear 7b, the biasing force by the right and left stroke springs 5b and 5c decreases.

The lower link pieces 6 and the upper link piece 7 carry stoppers 6c and 7c, respectively, to restrict the maximum degree of opening. The lower receiving member 3 may carry a rubber abutment member on which the upper receiving member 4 is seated when the saddle 50 is lowered to the limit.

Thus, the fixed tube 1 and the rising rod 2 are biased by the stroke springs 5b and 5c of the link mechanisms 5 in the direction in which the saddle 50 rises. The stroke spring means that biases the rising rod 2 upwardly relative to the fixed tube 1 is not limited to the stroke springs of the embodiment. For example, the stroke spring means may be a fluid spring in which air or other gas is sealed under pressure over the fixed tube 1 as a cylinder and the rising rod 2 as a piston such that the sealed gas acts as a spring by being compressed and expanded. Also, the stroke spring means may be a spring (such as a coil spring) placed in the fixed tube 1 or the rising rod 2 to bias the rising rod 2 upwardly relative to the fixed tube 1.

The biasing force of the stroke springs 5b and 5c, or any of the above-described other stroke spring means, is determined such that when the rider applies pressure on the pedals in order to start the bicycle, the saddle 50 automatically rises even without the rider trying to stand on the pedals, due to the rider's weight being partially distributed to the pedals. For example, the biasing force of the stroke spring means is preferably set at about 300 to 400 N, which is slightly smaller than the weight of a rider, while the saddle 50 is at the lowered position.

The saddle raising device 10 further includes a locking mechanism A configured to lock the rising rod 2 at a predetermined height relative to the fixed tube 1. The saddle raising device further includes a locking/unlocking switch B configured to switch the locking mechanism A between an ascent/descent allowing state in which the locking mechanism A allows ascent and descent of the rising rod 2, and a locking state in which the locking mechanism A restricts the ascent and descent of the rising rod 2.

The locking mechanism A is capable of locking the rising rod 2 at a predetermined height relative to the fixed tube 1. The locking mechanism A can also be switched over between an ascent/descent allowing state in which the rising rod 2 is allowed to ascend and descend, and a locking state in which the ascent and descent of the rising rod 2 is restricted. The locking mechanism A includes an engaging member 20 disposed in the fixed tube 1 and having a plurality of engaging recesses 20a arranged along the axial direction of the fixed tube 1. The locking mechanism A further includes claw members 22 carried by the rising rod 2 and each having a claw 22a configured to mesh with the engaging recesses 20a.

The locking/unlocking switch B includes a wire 32 that receives a pulling force inputted from an operating portion 30 when the operating portion 30 is operated by the rider; and a claw state switching member 24 configured to be pulled by the wire 32 while the pulling force is being applied to the wire 32, and thereby disengage the claws 22a from the engaging recesses 20a, and with the pulling force removed from the wire 32, configured to press the claws 22a into meshing engagement with the engaging recesses 20a under the biasing force of a compression spring 13.

The engaging member 20 is a center axis rod, i.e., a shaft-shaped member extending in the fixed tube 10 in the axial direction of the fixed tube 10. The engaging member 20 is fixed in position in the fixed tube 1 by a blind nut (fixed rotation preventor) 9 fixed to a lower inner side of the fixed tube 1 such that the axes of engaging member 20 and the fixed tube 1 coincide with each other.

The engaging recesses 20a are composed of a plurality of recesses arranged at predetermined intervals along the axial direction of the engaging member 20 from a mid-portion to an upper portion of the engaging member 20. The engaging recesses 20a form a plurality of groups, in which the engaging recesses 20a of each group are arranged in a single row in the axial direction, and the respective plurality of rows of the engaging recesses 20a are arranged around the center axis of the engaging member 20. In the embodiment, the engaging recesses 20a are arranged in two rows located opposite from each other across the center axis of the engaging member 20, with each row composed of engaging recesses 20a arranged along the axial direction. The engaging recesses 20a of each group (i.e., in each row) are located at the same axial positions as the corresponding engaging recesses 20 of the other group or groups, and the corresponding engaging recesses 20 of the respective groups are identical in size and shape to each other, and have starting and terminal ends at the same axial positions. While, in the embodiment, as described above, the engaging recesses 20a are arranged in two rows located opposite from each other across the center axis of the engaging member 20, they may be arranged in three rows or in a single row.

The rising rod 2 has, at its axially lower portion, a seal fitting groove extending the entire circumference of its outer periphery, and a seal 16 is fitted in the seal fitting groove. The outer diameter of the rising rod (piston) 2 is about 1 mm smaller than the inner diameter of the fixed tube (cylinder) 1. This creates a gap between the fixed shaft and the outer surface of the rising rod 2, and this gap prevents any oil that may enter the fixed tube 1 from adhering to the outer periphery of the rising rod 2. The seal 16 guides axial sliding movement between the fixed tube 1 and the rising rod 2.

Figure 1:
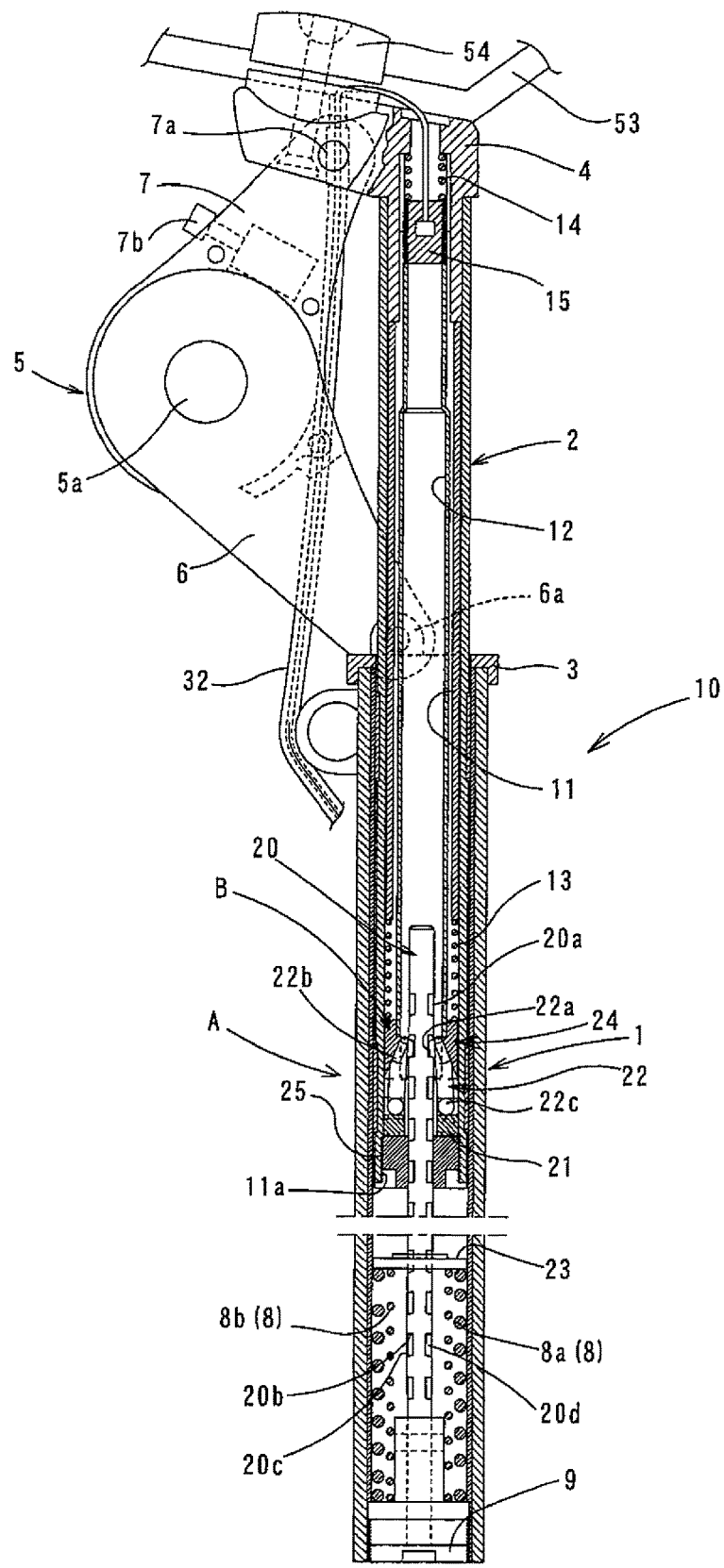
FIG. 1 is vertical sectional view of a saddle raising device according to one embodiment of the present invention.

As shown in FIG. 1, a reinforcing tube 11 and a wire engaging tube 12 are provided inside of the rising rod 2. The reinforcing tube 11 is disposed directly inside of the tubular member constituting the rising rod 2. The reinforcing tube 11 and the rising rod 2 are fixed to each other via the upper receiving member 4 so as to be movable in unison with each other. The wire engaging tube 12 is disposed directly inside of the reinforcing tube 11 so as to be axially slidable relative to the reinforcing tube 11.

A wire engaging member (cylinder rotation preventer) 15 is fitted and fixed to an upper portion of the wire engaging tube 12. The wire 32 extending from the operating portion (hand-operated switch device) 30 is connected to the wire engaging member 15 (see FIGS. 12 and 13). When the rider pulls, with his/her finger, an ascent lever 31a of the operating portion 30, the wire 32 receives a pulling force from the ascent lever 31, and pulls the wire engaging tube 12 upwardly. When the rider pulls, with his/her finger, a descent lever 31b of the operating portion 30, the pulling force is removed from the wire 32, so that the wire engaging tube 12 descends under the biasing force of a return spring 14 disposed on top of the wire engaging tube 12. In the embodiment, the return spring 14 is a coil spring.

At a lower portion of the wire engaging tube 12, from axially upward to downward, the claw state switching member 24, the claw members 22, and a claw receiving member 21 are disposed. The compression spring 13 is disposed between the claw state switching member 24 and the bottom end of the reinforcing tube 11. In the embodiment, the compression spring 13 is a coil spring. When the wire engaging tube 12 is pulled upward, the claw state switching member 24 ascends together with the wire engaging tube 12, against the biasing force of the compression spring 13. The claw receiving member 21 is prevented from falling off from the rising rod 2 by a nut 25 screwed into the bottom end of the rising rod 2. The claw members 22 engage the claw receiving member 21.

As described above, the locking mechanism A includes an engaging member (center axis rod) 20 disposed inside of the fixed tube 1, and the above-described claw members 22. The engaging member 20 has a plurality of engaging recesses 20a arranged along the tube center axis. In the embodiment, the engaging member 20 is a center axis rod extending in the fixed tube 1 so as to be coaxial with the fixed tube 1.

Figure 11A:
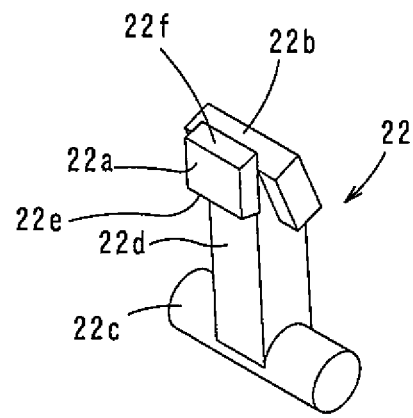
FIG. 11A is a perspective view of a claw member.
Figure 11B:
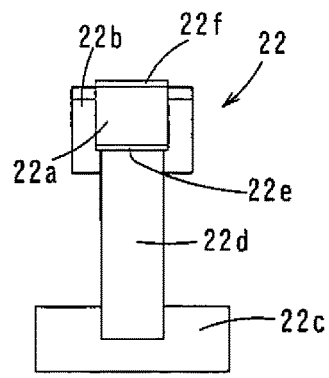
FIG. 11B is a front view of the claw member.
Figure 11C:
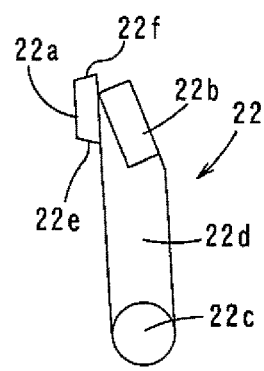
FIG. 11C is a right side view of FIG. 11B.
Figure 12:
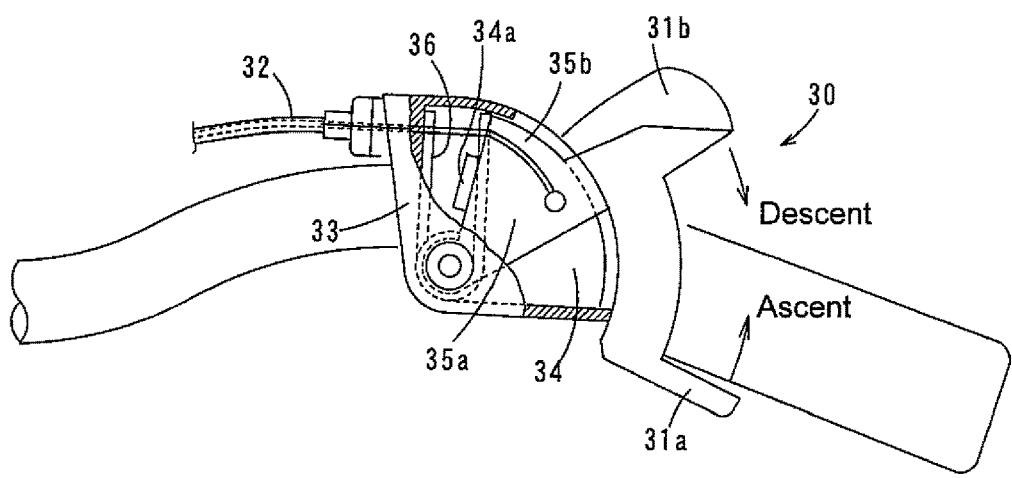
FIG. 12 is a plan view showing an operating portion.

As shown in FIGS. 11A to 11C, each claw member 22 includes a columnar support portion 22c; an arm 22d extending upwardly from around the axial mid-portion of the support portion 22c; and a claw 22a and a claw lobe 22b that are disposed at the upper end of the support portion 22c. By pivoting the arm 22d about the axis of the support portion 22c, the claw 22a moves between a state in which the claw 22a meshes with one of the engaging recesses 20a of the engaging member 20 (this state is hereinafter referred to as the "meshed state"), and a state in which the claw 22a meshes with none of the engaging recesses 20a (this state is hereinafter referred to as the "unmeshed state").

Figure 10A:
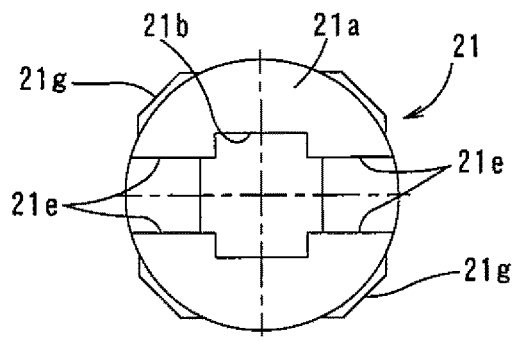
FIG. 10A is a plan view of a claw receiving member.
Figure 10B:
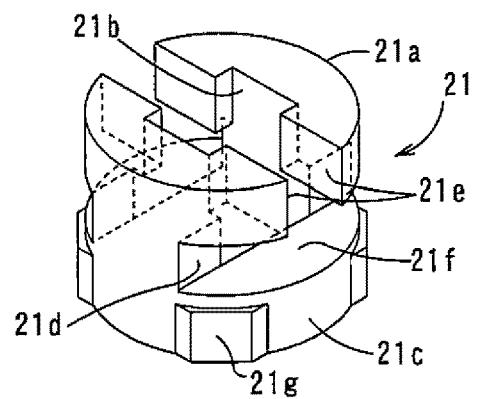
FIG. 10B is a perspective view of the claw receiving member.
Figure 10C:
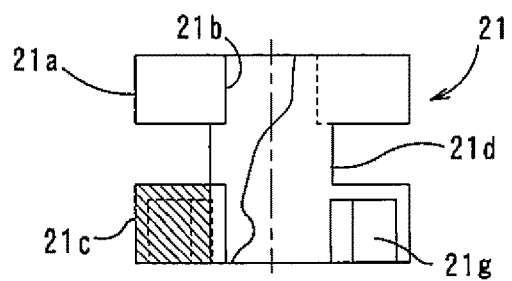
FIG. 10C is a partially cutaway front view of FIG. 10A.
Figure 10D:
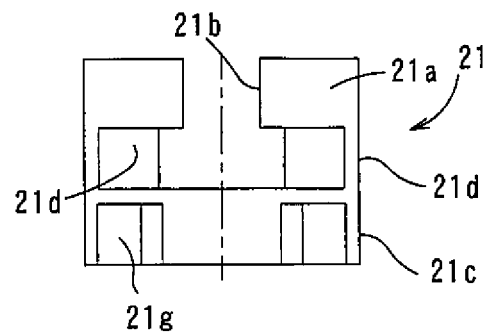
FIG. 10D is a right side view of FIG. 10C.
Figure 10E:
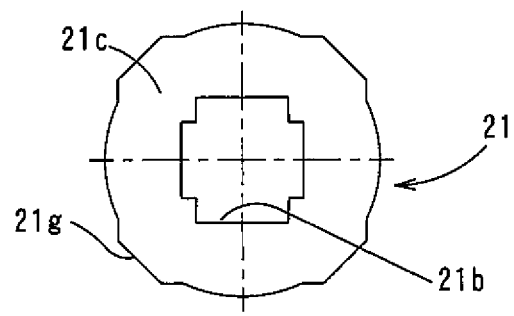
FIG. 10E is a bottom plan view of FIG. 10C.

The claw members 22 are supported by the claw receiving member 21, shown in FIGS. 10A to 10C. The claw receiving member 21 is received within the rising rod 2, and includes convex rotation preventers 21g on the outer periphery thereof, the rotation preventers 21b protruding into recesses (not shown) on the inner surface of the rising rod 2, thereby preventing rotation of the claw receiving member 21 and the rising rod 2 about the center axis. The rotation preventers 21g of the claw receiving member 21 are, as shown in FIG. 10A, composed of a plurality of (four in the embodiment) rotation preventers. The claw receiving member 21 has, in the center of its side surface, claw shaft receiving portions 21f composed of a pair of lateral grooves located opposite from each other across the center axis of the claw receiving member 21. The columnar support portions 22c of the claw members 22 are each received in a respective one of the claw shaft receiving portions 21f.

The claw receiving member 21 has, at its central portion, a center axis rod receiving portion 21b composed of a hole having a quadrangular cross-section. The center axis rod receiving portion 21b extends vertically through the upper portion 21a and the lower portion 21b of the claw receiving member 21. The center axis rod constituting the engaging member 20 is inserted through the center axis rod receiving portion 21b. The engaging member 20, having a quadrangular cross-section, is snugly fitted in the center axis rod receiving portion 21b, also having a quadrangular cross-section, and relative rotation therebetween is prevented. As shown in FIGS. 10A to 10E, the claw receiving member 21 further includes claw shafts 21d connecting together the upper portion 21a and the lower portion 21c, and slits 21e into which the arms 22d of the respective claw members 22 are inserted.

Figure 9A:
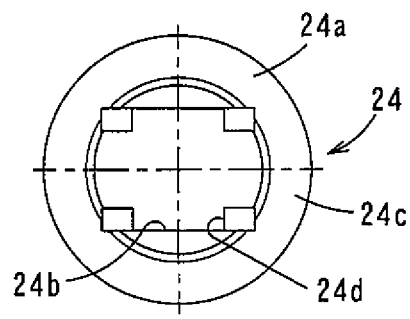
FIG. 9A is a plan view of a claw state switching member.
Figure 9B:
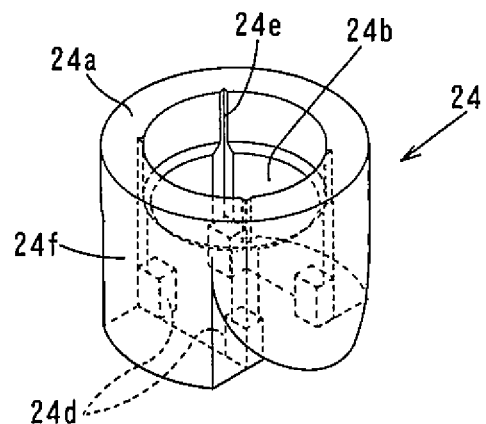
FIG. 9B is a perspective view of the claw state switching member.
Figure 9C:
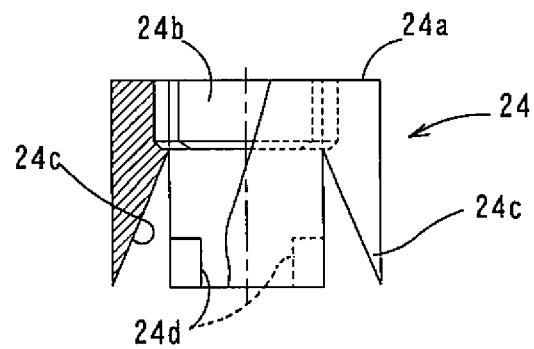
FIG. 9C is a partially cutaway front view of FIG. 9A.
Figure 9D:
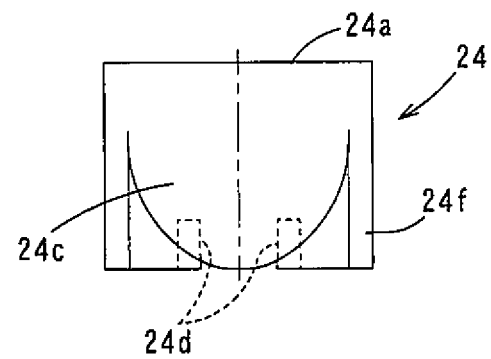
FIG. 9D is a right side view of FIG. 9A.
Figure 9E:
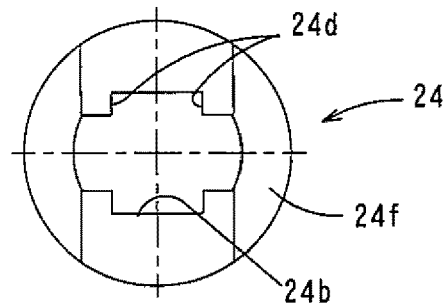
FIG. 9E is a bottom plan view of FIG. 9A.

The claw state switching member 24 has, at the upper central portion of its body 24a, a center axis rod receiving portion (wire engaging pipe hole) 24b having a circular cross-section. The lower end of the wire engaging tube 12 is fixedly fitted to the center axis rod receiving portion 24b. The claw state switching member 24 has, on its lower side surface, claw opening portions (claw disengaging portions) 24d, and includes claw pressers 24c extending downwardly from an upper portion of the outer periphery of the claw state switching member 24. A hole having a quadrangular cross-section is formed in the lower central portion of the body 24a, and the center axis rod constituting the engaging member 20 is inserted in this hole and rotationally fixed in position. In FIG. 9B, numeral 24e designates a groove, and numeral 24f indicates a skirt portion of the body 24a. The above-described various parts of the claw state switching member 24 are integrally formed from a resin or a metal.

Figure 6:
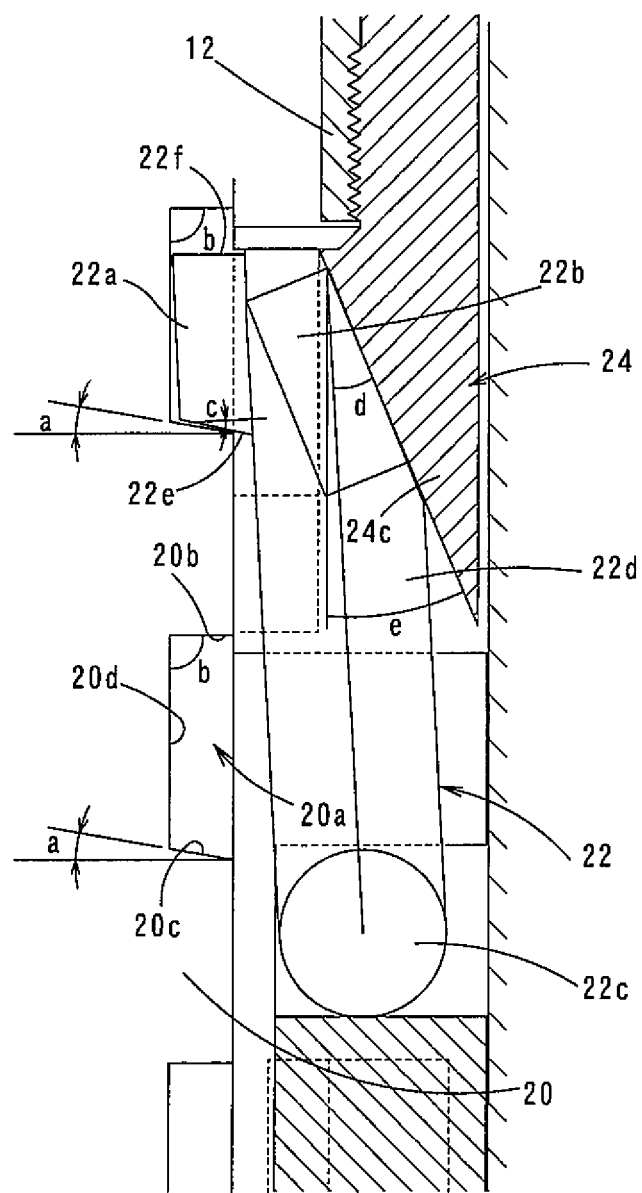
FIG. 6 is an enlarged view illustrating how an engaging member engages a claw member.
Figure 7A:
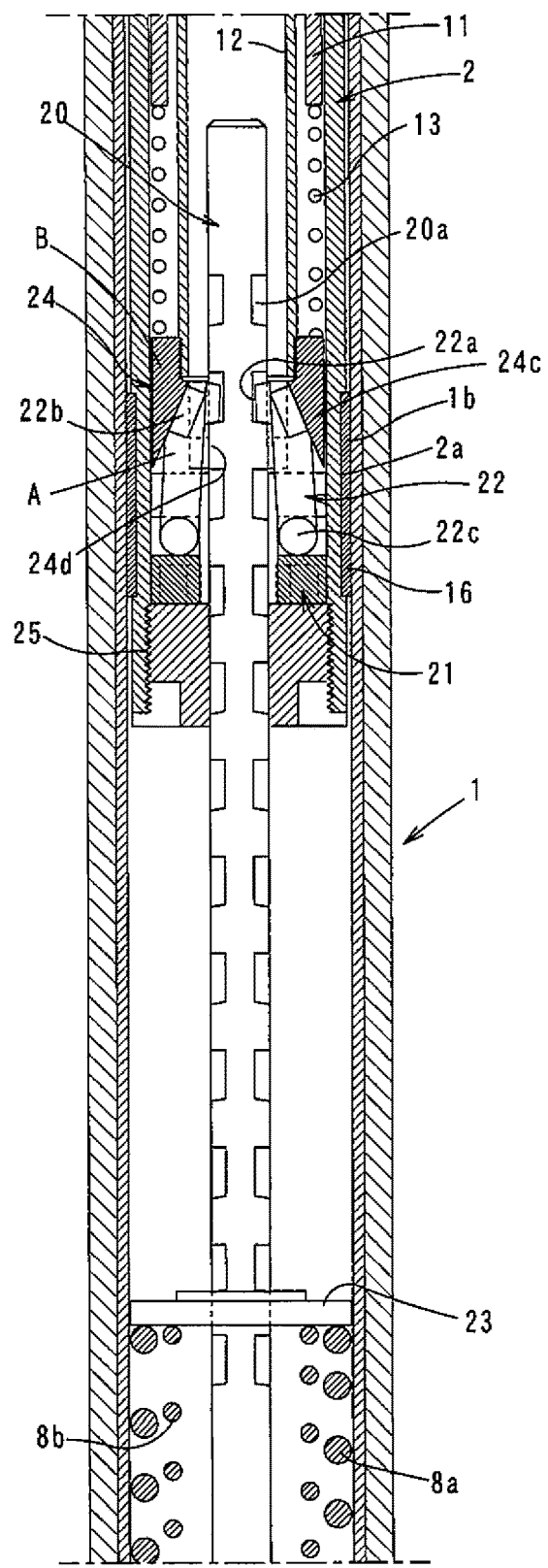
FIG. 7A is a partial enlarged view in vertical section illustrating an operational state of the embodiment.
Figure 7B:
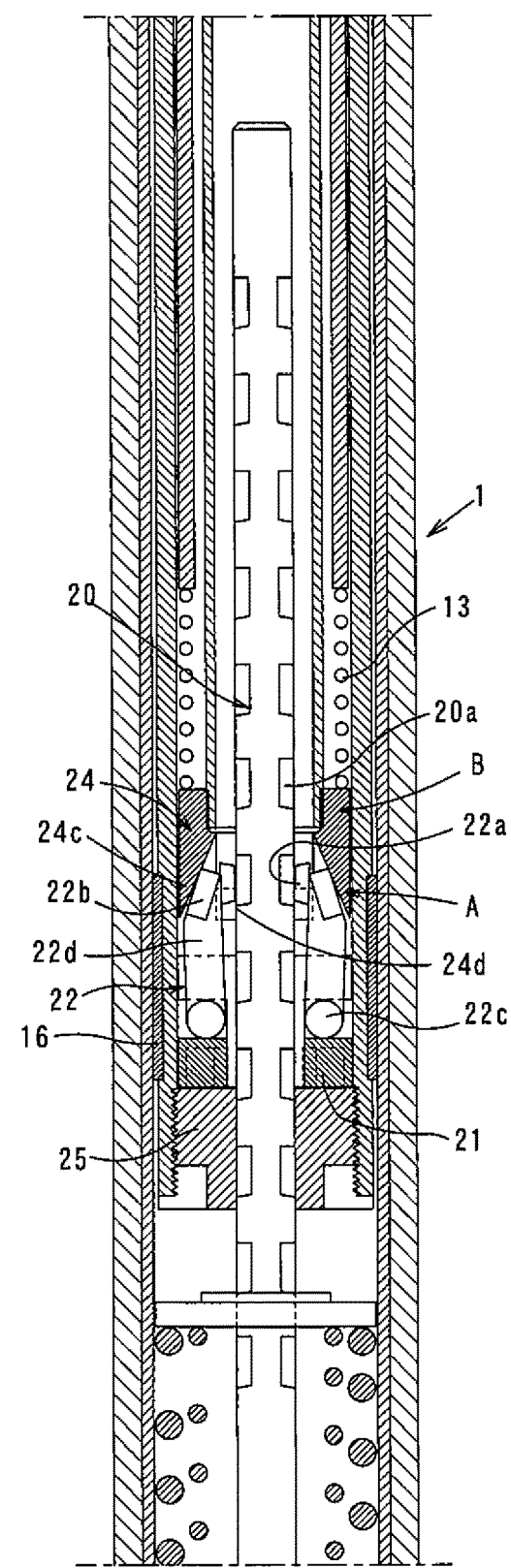
FIG. 7B is a partial enlarged view in vertical section illustrating an operational state of the embodiment.
Figure 8:
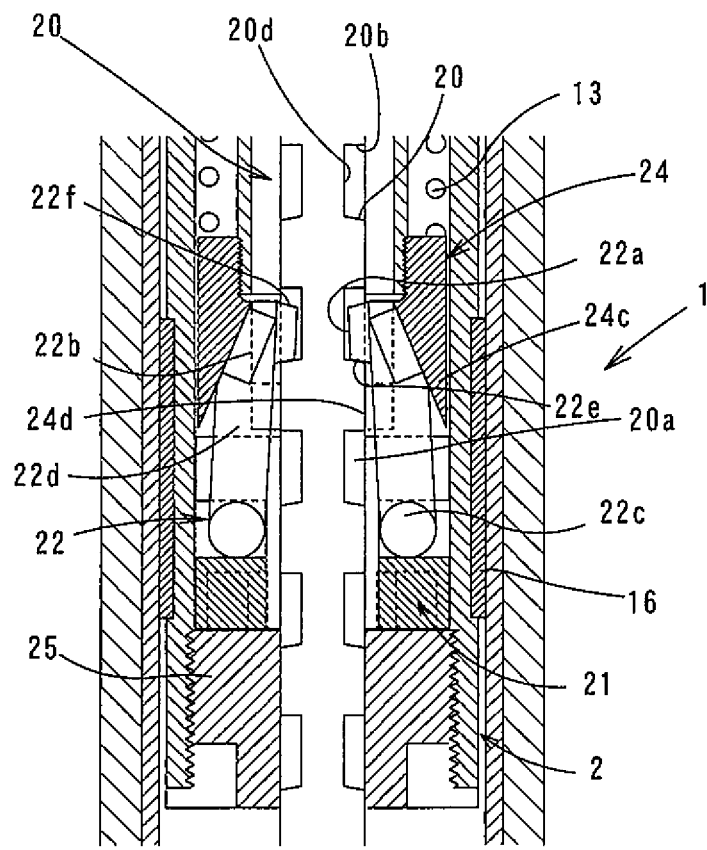
FIG. 8 is a partial enlarged view of FIG. 7A.

When the claw state switching member 24 is pulled by the wire 32 and rises upwardly together with the wire engaging tube 12 (by e.g., 6 mm up), the claw opening portions 24d abut, as shown in FIGS. 6 to 8, the respective claw lobes 22b, pushing the claw lobes 22b outwardly. This causes the claws 22a to pivot outwardly together with the arms 22d, from the meshed state, in which the claws 22 each mesh with a respective engaging recess 20a, to the unmeshed state. When, conversely, the claw state switching member 24 descends together with the wire engaging tube 12 (by e.g., 6 mm down), the claw pressers 24c push the claw lobes 22b inwardly. This causes the claws 22b to pivot inwardly together with the arms 22d, from the unmeshed state, in which the claws 22b mesh with none of the engaging recesses 20a, to the meshed state.

The lower end of the wire engaging tube 12 is supported by the rising rod 2 via the compression spring 13, while the upper end of the wire engaging tube 12 is supported by the rising rod 2 via the return spring 14. Thus, the claws 22a are firmly held in the meshed state in which the claws 22a each mesh with a respective engaging recess 20, under the downward biasing force of the compressing spring 13.

Because the engaging recesses 20a of one group (i.e., one row) is identical in axial position, size and shape to the corresponding engaging recess 20a of the other group, two of the claws 22a of the claw member 22 simultaneously mesh with the opposed two engaging recesses 20a, respectively. This provides a firm and stable locking state.

Each engaging recess 20a includes, in the cross-section shown in FIG. 6, which includes the center axis, a recess upper surface 20b configured to engage the upper end 22f of the corresponding claw 22a, a recess lower surface 20c configured to engage the lower end 22e of the claw 22a, and a recess bottom surface 20d connecting together the recess upper surface 20b and the recess lower surface 20c. The recess upper surface 20b is a flat surface extending in the direction perpendicular to the axis (i.e., angle "b" (see FIG. 6) relative to the axial direction is 90 degrees). The recess lower surface 20c is also a flat surface, and this flat surface slopes downward in the direction away from the recess bottom surface 20d (i.e., angle "a" (see FIG. 6) relative to the axial direction is larger than zero degrees).

Description is now made of how the claws 22a are moved from the meshed state, in which the claws 22a mesh with a pair of the engaging recesses 20a, to the unmeshed state. When the claw state switching member 24 rises by being pulled by the wire 32, the claw opening portions 24d abut the claw lobes 22b and push the claw lobes 22 outward. Before this operation, the load from the rider (weight of the rider) is pressing the rising rod 2 downwardly against the biasing force of cushion springs 8 disposed at the bottom of the fixed tube 1, and thus the claw state switching member 24 is also pressed downwardly together with the reinforcing tube 11. When, in this state, the rider partially removes his/her weight from the saddle, the load on the claw state switching member 24 decreases, so that by operating the wire 32 in this state, the claw state switching member 24 can be easily lifted up. While the full load from the rider is acting on the claw state switching member 24, due to this load, the lower ends 22e of the claws 22a and the corresponding recess lower surfaces 20 firmly mesh with each other. When this load decreases, because the claw state switching member 24 becomes able to be lifted up, the claws 22a become easily pivotable outward together with the arms 22d. That is, the rising rod 2 becomes able to easily ascend and descend. Thus, in this state, the rider can lower the rising rod 2 by increasing the rider's load on the saddle, or can raise the rising rod 2 under the biasing force of the stroke springs 5b and 5c, by further reducing the load on the saddle.

Next, description is made of how the claws 22a are moved from the unmeshed state, in which the claws 22a mesh with none of the engaging recesses 20a, to the meshed state. When the rising rod 2 reaches a desired height by adjusting the rider's load on the saddle, the rider causes the claw state switching member 24 to be lowered together with the wire engaging tube 12 under the biasing force of the compression spring 13. This causes the claw lobes 22b to be pressed inwardly by the claw pressers 24c. In this state, the rising rod 2 is being pressed downward by the load from the rider (rider's weight) against the biasing force of the cushion springs 8. Thus, the claw state switching member 24 presses the claw lobes 22b with a strong force, and this causes the claws 22a to be pivoted inwardly together with the arms 22d, i.e., to be moved from the unmeshed state, in which the claws 22a mesh with none of the engaging recesses 20a, to the meshed state. In this state, as shown in FIG. 6, an axial gap is present between the upper end 22f of each claw 22a and the opposed recess upper surface 20b. Thus, the claws 22a can smoothly mesh. Also, even when the load from the rider decreases thereafter, because the upper ends 22f of the claws 22a engage the opposed recess upper surfaces 20b, the meshed state is maintained. Each recess upper surface 20b may be sloped downwardly in the direction away from the recess bottom surface 20d.

FIG. 6 shows the meshed state, and letter "d" in FIG. 6 indicates the angle of the outer surface of the claw lobe 22b of each claw member 22 relative to the center axis of the arm 22d, while letter "e" indicates the angle of the inner surface of each claw presser 24c relative to the center axis of the rising rod 2. In the embodiment, these angles satisfy the relation: d<e so that the outer surfaces of the claw lobes 22b and the respective claw pressers 24c come into surface contact with each other, thereby allowing the claws to be, in a reliable manner, moved to the meshed state, and kept in the meshed state.

As described above, in the embodiment, the load of the rider that acts on the saddle 50 is received by the force that tends to raise the rising rod 2 relative to the fixed tube 1, and by partially transmitting the load to the engaging member 20 by pivoting, in the rising rod 2, the claw members 22 toward respective engaging recesses 20a, until they mesh with each other. Thus, the invention provides a saddle raising device which enables the saddle 50 to be reliably locked in position at a predetermined height, and which is rigid and stable enough to withstand the rider's weight.

Further, the axial distance between the lower surface (descent stop surface) 20c and the upper surface (ascent stop surface) 20b, of each engaging recess 20a, which serves as a claw receiving recess, is larger (e.g., 1 mm larger) than the axial length of the claw 22a of each claw member 22 in the meshed state, i.e., its protruding length. With the load from the saddle 50 acting on the lower surface 20c of each engaging recess 20a via the claw member 22, a gap (1 mm in the embodiment) is present between the upper end 22f of the claw 22a and the upper surface 20b of the engaging recess 20a. Due to this gap, when the claw member 22 moves from the meshed state to the unmeshed state, the claw 22a pivots. Although, due to this pivoting motion, the position of the upper end 22f of the claw 22a rises slightly (0.35 mm in the embodiment), a gap (0.65 mm in the embodiment) still remains between the upper surface 20b of the engaging recess 20a and the claw 22a, so that the engaging recess 20a does not hinder the pivoting motion of the claw member 22.

Figure 2:
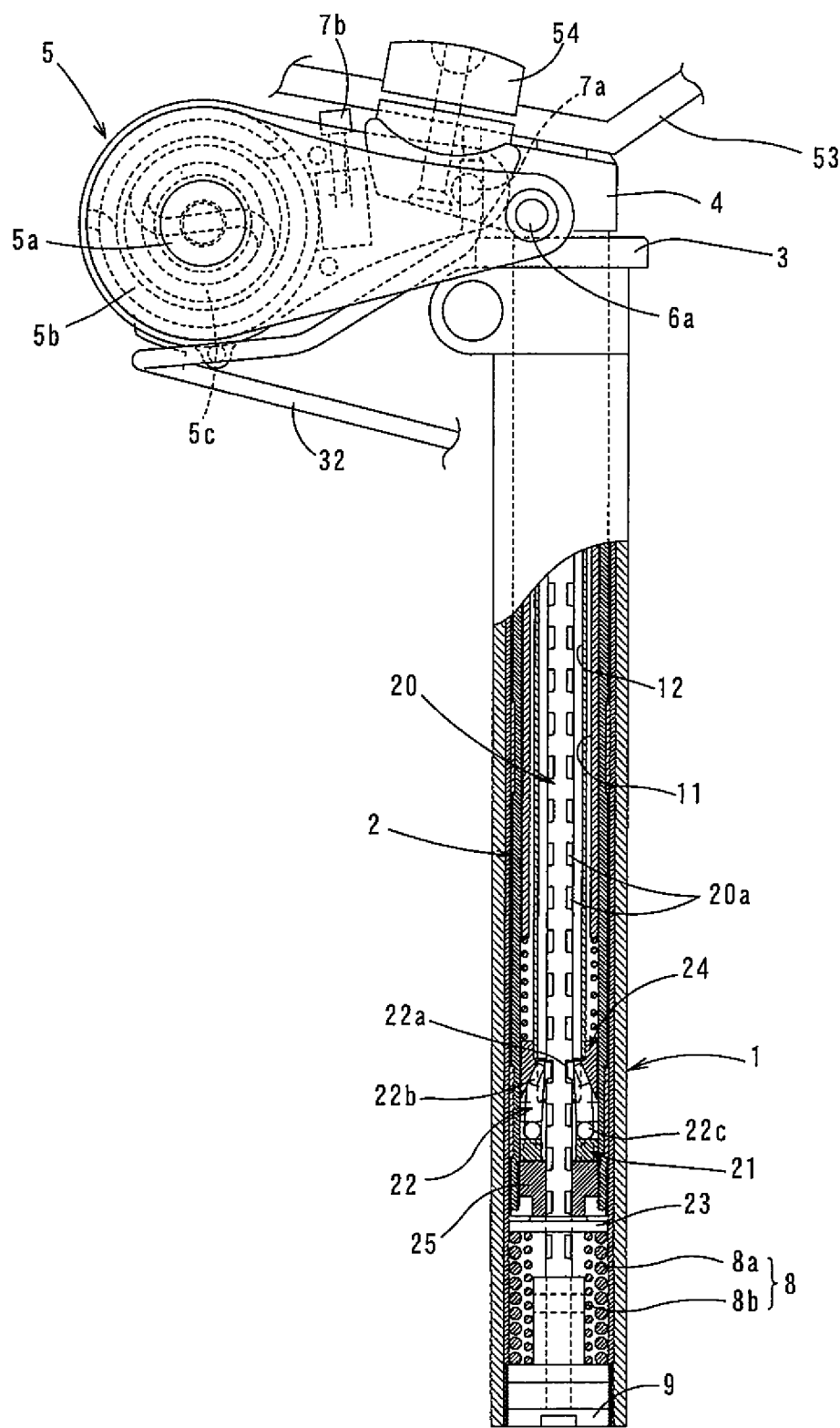
FIG. 2 is an enlarged view of a portion of FIG. 1.
Figure 3:
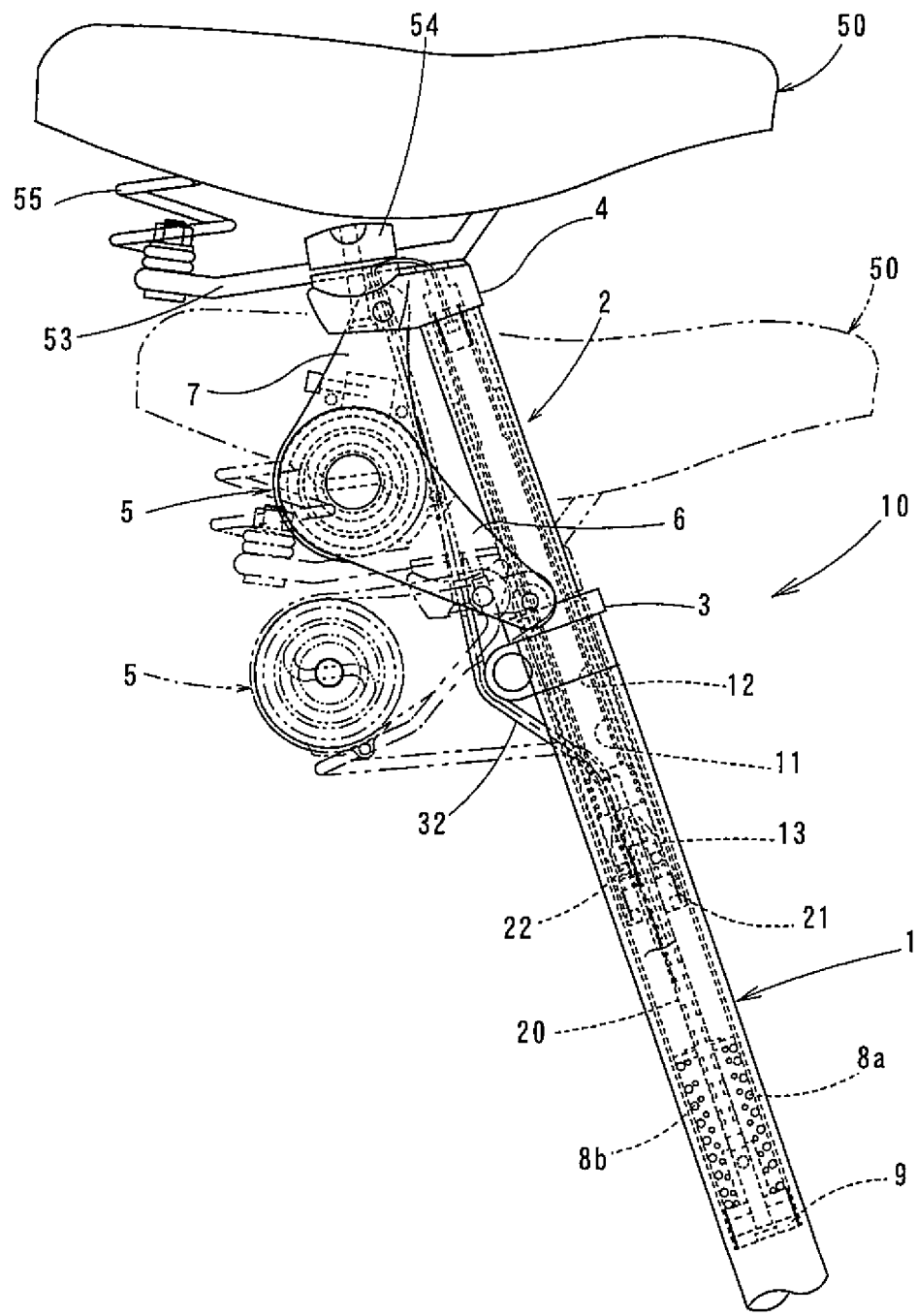
FIG. 3 illustrates an operational state of the saddle raising device of the embodiment.
Figure 4:
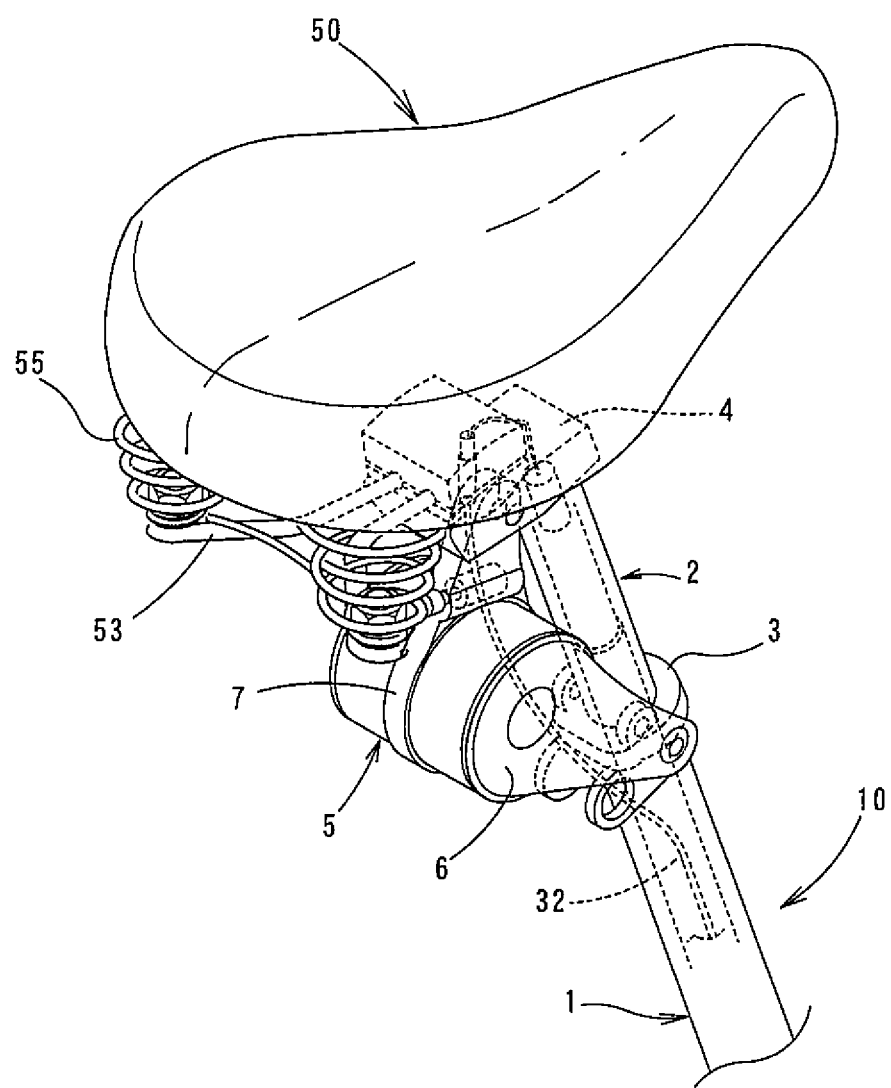
FIG. 4 is a perspective view of a portion of FIG. 1 as seen from above.

As shown in FIGS. 1 and 2, the cushion springs 8 are disposed under the rising rod 2 in the fixed tube 1, while being compressed from the free state. In the embodiment, the cushion springs 8 are composed of two coil springs, i.e., a large-diameter outer spring 8a and a small-diameter inner spring 8b, with the large-diameter outer spring 8a having a large wire diameter, and the small-diameter inner spring having a wire diameter smaller than the outer spring 8*a*. The upper ends of the cushion springs 8 are supported by a spring receiving washer 23, and the lower ends of the cushion springs 8 are supported by an anti-rotation spring support 9.

As shown in FIG. 1, near the lower end of the engaging member 20, specifically, below the rising rod 2 when the rising rod 2 is at the lowermost position (e.g., 1 mm below the lowermost position), a tubular, engaging member support portion rises upward from the anti-rotation support 9. The lower end of the engaging member 20 is fitted in the engaging member support portion such that the engaging member 20 is supported by the anti-rotation spring support 9 so as to rise therefrom. The engaging member support portion has (e.g., 47 mm below the lowermost position of the rising rod 2) a pin hole laterally extending therethrough (see the lower portion of FIG. 1). A pin is inserted in the pin hole to prevent the engaging member 20 from being pulled out. Both ends of the pin protrude (e.g., 1 mm) from the outer surface of the engaging member 20. The protruding ends of the pin limit upward movement of the anti-rotation spring support 9 by abutting it. Although the cushioning effect against the load of the rider when the rider is sitting on the saddle decreases by the amount of the elastic force of the cushion springs 8 reduced by the protruding ends, the cushion springs 8 are still capable of absorbing upward impact forces transmitted from the wheels 56 when the wheels 56 move over a step.

While, in the embodiment, the cushion springs 8 are two separate coil springs composed of a large-diameter outer spring 8*a* and a small-diameter inner spring 8*b*, the cushion springs 8 may be composed of a single coil spring, or may be composed of an elastic member or members other than coil springs.

DESCRIPTION OF THE SYMBOLS

1. Fixed tube (cylinder)
2. Rising rod (piston)
3. Lower receiving member
4. Upper receiving member
5. Link mechanism
5*a*. Center axis member
5*b*. Stroke spring (outer spring)
5*c*. Stroke spring (inner spring)
5*d*. Helical gear
6. Lower link piece
6*a*. Pin
7. Upper link piece
7*a*. Pin
7*b*. Worm gear
8. Cushion spring
8*a*. Outer spring
8*b*. Spring
9. Screw (anti-rotation spring support)
10. Saddle raising device
11. Reinforcing tube
12. Wire engaging tube
13. Compression spring
14. Return spring
15. Wire engaging member (cylinder rotation preventer)
16. Seal
20. Engaging member (center axis rod)
20*a*. Engaging recess
20*b*. Recess upper surface
20*c*. Recess lower surface
21. Claw receiving member
21*a*. Upper portion
21*b*. Center axis rod receiving portion
21*c*. Lower portion
21*d*. Claw shaft
21*e*. Slit
21*f*. Claw shaft receiving portion
21*g*. Rotation preventer
22. Claw member
22*a*. Claw
22*b*. Claw lobe
22*c*. Claw shaft
22*d*. Arm
23. Spring receiving washer
24. Claw state switching member
24*a*. Body
24*b*. Center axis rod receiving portion
24*c*. Claw presser
24*d*. Claw opening portion
24*e*. Groove
24*f*. Skirt portion
25. Nut
30. Operating portion (hand-operated switch device)
31*a*. Ascent lever
31*b*. Decent lever
32. Wire
33. Outer case
34. Spring support
35*a*. Fan-shaped portion
35*b*. Lever
36. Spring
50. Saddle
51. Handle
52. Grip
53. Saddle frame
55. Saddle spring
56. Wheel
59. Frame
60. Bicycle
A. Locking mechanism
B. Locking/unlocking switch

What is claimed is:

1. A saddle raising device comprising:
   a fixed tube configured to be inserted into a frame of a bicycle;
   a rising rod having an upper end portion to which a saddle of the bicycle is to be mounted, the rising rod being slidably inserted in the fixed tube;
   a stroke spring biasing the rising rod upwardly in an axial direction of the fixed tube, relative to the fixed tube;
   a locking mechanism configured to lock the rising rod relative to the fixed tube at a predetermined height; and
   a locking/unlocking switch configured to switch the locking mechanism between an ascent/descent allowing state, in which the locking mechanism allows ascent and descent of the rising rod, and a locking state, in which the locking mechanism restricts the ascent and descent of the rising rod;
   wherein the locking mechanism includes:
     an engaging member in the fixed tube and having a plurality of engaging recesses arranged in the axial direction of the fixed tube; and
     a claw member carried by the rising rod and having a claw configured to be capable of meshing with any one of the engaging recesses;
   wherein the locking/unlocking switch includes:
     a wire configured to receive a pulling force inputted from an operating portion of the bicycle when a rider of the bicycle operates the operating portion; and a claw state switching member configured to be pulled by the wire while the pulling force is being applied to the wire, and thereby disengage the claw; from the engaging recess, and with the pulling force removed from the wire, configured to press the claw into meshing engagement with a selected one of the engaging recesses.

2. The saddle raising device of claim 1:
wherein the engaging member is a center axis rod rising in the fixed tube;
wherein the plurality of engaging recesses are composed of a plurality of groups of engaging recesses, each group of engaging recesses being arranged in a circumferential direction around an axis of the center axis rod; and
wherein the claw member is composed of a plurality of claw members arranged such that the claws of the plurality of claw members are capable of meshing simultaneously with the engaging recesses of any group, respectively.

3. The saddle raising device of claim 2, wherein the claw state switching member is carried by a wire engaging tube connected to the wire, and the wire engaging tube has a lower end thereof supported by the rising rod via a compression spring, and has an upper end thereof supported by the rising rod via a return spring.

4. The saddle raising device of claim 3, wherein each of the engaging recesses includes: a recess upper surface configured to engage an upper end of a corresponding one of the claws; a recess lower surface configured to engage a lower end of the corresponding one of the claws; and a recess bottom surface connecting together the recess upper surface and the recess lower surface, and
wherein the recess upper surface either extends perpendicular to the axial direction, or slopes downward in a direction away from the recess bottom surface, and the recess lower surface slopes downward in the direction away from the recess bottom surface.

5. The saddle raising device of claim 2, wherein each of the engaging recesses includes: a recess upper surface configured to engage an upper end of a corresponding one of the claws; a recess lower surface configured to engage a lower end of the corresponding one of the claws; and a recess bottom surface connecting together the recess upper surface and the recess lower surface,
wherein the recess upper surface either extends perpendicular to the axial direction, or slopes downward in a direction away from the recess bottom surface, and wherein the recess lower surface slopes downward in the direction away from the recess bottom surface.

6. The saddle raising device of claim 1, wherein the claw state switching member is carried by a wire engaging tube connected to the wire, and the wire engaging tube has a lower end thereof supported by the rising rod via a compression spring, and has an upper end thereof supported by the rising rod via a return spring.

7. The saddle raising device of claim 6, wherein each of the engaging recesses includes: a recess upper surface configured to engage an upper end of the claws; a recess lower surface configured to engage a lower end of the claws; and a recess bottom surface connecting together the recess upper surface and the recess lower surface, and
wherein the recess upper surface either extends perpendicular to the axial direction, or slopes downward in a direction away from the recess bottom surface, and the recess lower surface slopes downward in the direction away from the recess bottom surface.

8. The saddle raising device of claim 1, wherein each of the engaging recesses includes: a recess upper surface configured to engage an upper end of the claw or a corresponding one of the claws; a recess lower surface configured to engage a lower end of the claw or the corresponding one of the claws; and a recess bottom surface connecting together the recess upper surface and the recess lower surface, and
wherein the recess upper surface either extends perpendicular to the axial direction, or slopes downward in a direction away from the recess bottom surface, and the recess lower surface slopes downward in the direction away from the recess bottom surface.

\* \* \* \* \*